United States Patent
Gage et al.

(10) Patent No.: US 9,204,467 B2
(45) Date of Patent: Dec. 1, 2015

(54) COMMUNICATING ENCODED TRAFFIC DATA

(71) Applicant: RESEARCH IN MOTION LIMITED, Waterloo (CA)

(72) Inventors: William Anthony Gage, Stittsville (CA); Biswaroop Mukherjee, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 181 days.

(21) Appl. No.: 13/710,856

(22) Filed: Dec. 11, 2012

(65) Prior Publication Data

US 2014/0160926 A1     Jun. 12, 2014

(51) Int. Cl.
- *H04B 7/216* (2006.01)
- *H04W 74/08* (2009.01)
- *H04W 74/00* (2009.01)

(52) U.S. Cl.
CPC ........ *H04W 74/0833* (2013.01); *H04W 74/006* (2013.01)

(58) Field of Classification Search
CPC ................................................. H04W 74/0833
USPC .................. 370/342, 343, 345, 328, 329, 344
See application file for complete search history.

(56) References Cited

U.S. PATENT DOCUMENTS

| | | | |
|---|---|---|---|
| 8,229,437 B2* | 7/2012 | Bourlas et al. | 455/436 |
| 8,259,688 B2* | 9/2012 | Bourlas et al. | 370/335 |
| 8,532,052 B2* | 9/2013 | Bourlas et al. | 370/330 |
| 8,976,748 B2* | 3/2015 | Uemura | 370/329 |
| 2005/0002361 A1 | 1/2005 | Dick et al. | |
| 2008/0056193 A1* | 3/2008 | Bourlas et al. | 370/331 |
| 2010/0220668 A1* | 9/2010 | Yamada et al. | 370/329 |
| 2011/0268081 A1* | 11/2011 | Bourlas et al. | 370/330 |
| 2012/0008524 A1* | 1/2012 | Amirijoo et al. | 370/252 |
| 2012/0057535 A1* | 3/2012 | Zhang et al. | 370/329 |
| 2012/0063398 A1* | 3/2012 | Hamaguchi et al. | 370/329 |
| 2012/0069788 A1* | 3/2012 | Shen et al. | 370/315 |
| 2012/0082103 A1* | 4/2012 | Lin et al. | 370/329 |
| 2012/0294274 A1* | 11/2012 | Bourlas et al. | 370/330 |
| 2013/0034069 A1* | 2/2013 | Uemura | 370/329 |
| 2013/0121258 A1 | 5/2013 | Mukherjee et al. | |
| 2013/0232393 A1* | 9/2013 | Przybylski | 714/773 |
| 2013/0315145 A1* | 11/2013 | Bourlas et al. | 370/328 |
| 2013/0322413 A1* | 12/2013 | Pelletier et al. | 370/336 |
| 2015/0139172 A1* | 5/2015 | Uemura | 370/329 |
| 2015/0139422 A1* | 5/2015 | Jover | 380/270 |

OTHER PUBLICATIONS

Provisional U.S. Appl. No. 61/653,946, filed on May 31, 2012.*
Wikipedia, AlohaNet dated on or before Nov. 30, 2012 (8 pages).
Mukherjee et al., U.S. Appl. No. 13/470,238 entitled Method and System for Partitioning Contention Based Resources in a Wireless Network filed May 11, 2012 (82 pages).

(Continued)

*Primary Examiner* — Chuong T Ho
(74) *Attorney, Agent, or Firm* — Trop Pruner & Hu, P.C.

(57) ABSTRACT

An electronic device encodes traffic data as a collection of codes. The electronic device sends the codes in random access resources or shared transmission resources over a wireless link to a wireless access network node, the codes providing an encoded representation of the traffic data.

21 Claims, 10 Drawing Sheets

(56) References Cited

OTHER PUBLICATIONS

3GPP TR 23.888 V11.0.0 Technical Report 3rd Generation Partnership Project; Technical Specification Group Services and System Aspects; System improvements for Machine-Type Communications (MTC) (Release 11) (Sep. 2012) (165 pages).

3GPP TS 36.213 V11.0.0 Technical Specification 3rd Generation Partnership Project; Technical Specification Group Radio Access Network; Evolved Universal Terrestrial Radio Access (E-UTRA); Physical layer procedures (Release 11) (Sep. 2012) (143 pages).

3GPP TS 36.300 V11.3.0 Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (Sep. 2012) (205 pages).

3GPP TS 36.331 V11.1.0 Technical Specification 3rd Generation Partnership Project; Technical Specification Group Radio Access Network; Evolved Universal Terrestrial Radio Access (E-UTRA); Radio Resource Control (RRC); Protocol specification (Release 11) (Sep. 2012) (325 pages).

3GPP TR 23.887 V0.5.0 Technical Report 3rd Generation Partnership Project; Technical Specification Group Services and System Aspects; Machine-Type and other Mobile Data Applications Communications Enhancements (Release 12) (Nov. 2012) (95 pages).

Mukherjee et al., U.S. Appl. No. 13/295,460 entitled Method and System for Requesting a Service Utilizing a Sequence of Codes filed Nov. 14, 2011 (63 pages).

3GPP TSG-RAN WG2 #66bis R2-093812, Los Angeles, USA, Agenda Item: 7.2 Source: Ericsson, ST-Ericsson, Contention based uplink transmissions, Discussion and proposal, Jun. 29-Jul. 3, 2009 (4 pages).

Canadian Intellectual Property Office, International Search Report and Written Opinion of PCT/CA2013/050952 dated Mar. 11, 2014 (12 pages).

TSG-RAN Working Group1 meeting #2, Yokohama, TSGR1#2(99)042; Source: Philips; Title: The FAUSCH Concept; Document for: Discussion and Decision dated Feb. 1999 (12 pages).

TS 25.211 V2.1.0, Technical Specification, 3rd Generation Partnership Project (3GPP); Technical Specification Group (TSG) Radio Access Network (RAN); Working Group 1 (WG1); Physical channels and mapping of transport channels onto physical channels (FDD); Jun. 1999 (38 pages).

ETSI TR 101 866 V1.1.1, Technical Report, Satellite Earth Stations and Systems (SES); Satellite Component of UMTS/IMT-2000; Analysis and definition of the Packet Mode; Jul. 2001 (50 pages).

* cited by examiner

COMMUNICATING ENCODED TRAFFIC DATA

BACKGROUND

Various different types of electronic devices can perform wireless communications in a wireless access network. Examples of such electronic devices include user equipments (devices used by users), sensor devices (which collect measurement data for communication to one or more recipient systems), and so forth. As the number of electronic devices served by a wireless access network increases, the increased burden placed on the wireless access network may lead to poor communications performance.

BRIEF DESCRIPTION OF THE DRAWINGS

Some embodiments are described with respect to the following figures.

DETAILED DESCRIPTION

Figure 1:
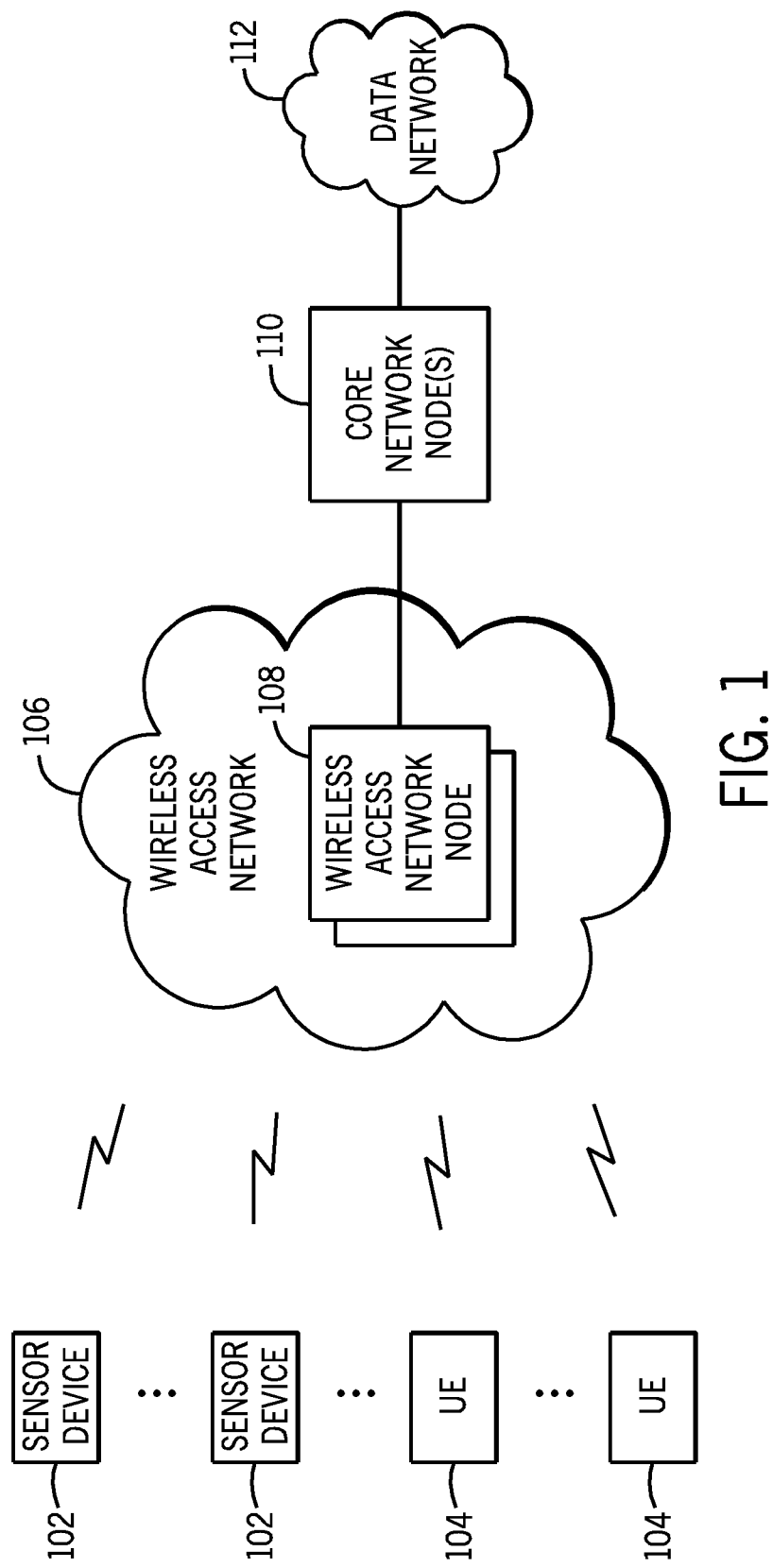
FIG. 1 is a block diagram of an example arrangement including sensor devices, user equipments, and wireless access network nodes according to some implementations.

Sensor devices can be used to measure different types of parameters. Examples of such parameters include temperature, pressure, gas concentration (e.g. concentration of a hazardous gas), strain of a mechanical structure, and so forth. Some sensor devices can be placed at fixed geographic positions. Other sensor devices may be mobile, and can move around within a coverage area of a wireless access network.

The number of sensor devices to be supported by a wireless access network may exceed the number of traditional user equipments (e.g. telephone handsets, smartphones, personal digital assistants, notebook computers, tablet computers, etc.). It is expected that a next generation wireless access network may be expected to support a number of sensor devices that can be several orders of magnitude greater than the number of traditional UEs.

A wireless access network can serve a number of coverage areas (also referred to as cells or cell sectors). Traditional wireless access networks are designed to accommodate the communication and usage model associated with UEs. However, the characteristics of sensor device communications may differ from the characteristics of UE communications. For example, sensor devices generally report data intermittently and at unpredictable times, such as when a sensor device is programmed to report data only if measurement data collected by the sensor device exceeds a predefined value or a rate of change. Sensor devices may also have reduced mobility, since sensor devices may be deployed at fixed locations or can be used within a restricted area (such as in a home, a store, a warehouse, and so forth). Additionally, sensor devices may operate on battery power that cannot be easily recharged, such that it is desired that communications of sensor devices consume as little battery power as possible.

The amount of data communicated by a sensor device can be relatively small when compared to the amount of data communicated by a traditional UE. In some cases, the recipient of the measurement data from a sensor device may be interested in just the measurement data (and possibly a location of the corresponding sensor device), but may not be interested in the identity of the sensor device itself. In addition, in some example scenarios, a sudden change in condition within an environment may cause a relatively large number of sensor devices in the environment to simultaneously report their measurement data. Such simultaneous reporting by a relatively large number of sensor devices is referred to as a reporting storm, and may overwhelm a wireless access network.

In contrast, the communication and usage model of traditional UEs assumes relatively long-lived communication sessions that involve the exchange of relatively large amounts of data between the UEs. Using the communication and usage model for traditional UEs to support communications of sensor devices may be inefficient and can lead to overloading of a wireless access network.

If a sensor device operates according to traditional procedures used for UE communications, the following may be employed. The sensor device sends a random access request to a wireless access network and receives a subsequent grant for uplink transmission resources. A dedicated signaling radio bearer can then be established, and a sensor device then identifies itself to the wireless access network. The sensor device then performs an authentication procedure with the wireless access network, and a dedicated data radio bearer is then established. The data of the sensor device can then be transmitted over the dedicated data radio bearer. Upon completion, the dedicated data radio bearer can be released, and the dedicated signaling radio bearer can be released. The foregoing process involves a relatively large signaling overhead, results in relatively large battery consumption, and is associated with increased latency in obtaining radio communication resources to allow the sensor device to perform communications. Additionally, when applied to sensor devices, the foregoing process involves inefficient use of radio resources, and if there are a relatively large number of sensor devices that are reporting simultaneously (a reporting storm), the wireless access network can become overwhelmed by the reporting storm.

In accordance with some implementations, to achieve more efficient communications in a wireless access network by sensor devices, traffic data that is to be communicated by a sensor device can be encoded into a collection of codes that are then transmitted in random access resources of the wireless access network. Such a procedure is associated with reduced signaling overhead and more efficient use of radio resources of the wireless access network.

In the ensuing discussion, reference is made to communicating traffic data of a sensor device. More generally, the traffic data of any electronic device (including a UE, sensor device, or other type of device) can be communicated in random access resources according to some implementations. Traffic data of an electronic device refers to data that is to be communicated by the electronic device to another device—traffic data differs from any signaling data that is communicated between an electronic device and a wireless access network node to obtain access of wireless resources of the wireless access network node. Traffic data can refer to user data, data generated by a software application, data measured by a sensor device, or any data that is to be consumed by a recipient of the data.

A random access resource refers to a resource of a wireless access network that is traditionally used by an electronic device to initiate access to the wireless access network. Such access can be part of a contention-based random access procedure in which the electronic device can use the random access resource to perform a random access attempt with the wireless access network. According to the Long-Term Evolution (LTE) wireless access technology, a random access resource includes a resource of a Physical Random Access Channel (PRACH). A PRACH can be semi-statically allocated by a wireless access network node in each frame or in each of certain frames (e.g. even-numbered frames). An LTE frame is a data container having a predefined structure. For example, an LTE frame can include LTE subframes, and each subframe has a predefined time length. According to LTE, for example, a PRACH occupies six resource blocks (RBs) in the frequency domain and two slots in the time domain. In other examples, a random access resource can have other predefined formats.

Within each PRACH, the wireless access network node can configure a certain number of orthogonal codes for use in contention-based random access attempts. These orthogonal codes can be Zadoff-Chu orthogonal codes, which are also referred to as preambles. An orthogonal code is spread over the frequency spectrum of a given radio channel. Multiple orthogonal codes transmitted by multiple electronic devices can be detected by a wireless access network node. Different orthogonal codes transmitted simultaneously do not interfere with each other, so that they can be successfully decoded by the wireless access network node.

LTE is defined by standards provided by the Third Generation Partnership Project (3GPP). The LTE standards are also referred to as the Evolved Universal Terrestrial Radio Access (E-UTRA) standards. In an LTE wireless access network, a wireless access network node is an enhanced Node NB (eNB), which provides base station and base station controller functionalities. Although the ensuing discussion refers to LTE communications, it is noted that techniques or mechanisms according to some implementations can also be applied with other wireless access technologies. More generally, instead of referring to eNBs that are used in LTE wireless access networks, the ensuing discussion refers to wireless access network nodes. A wireless access network node is a node in a wireless access network that is accessed by an electronic device to perform wireless communications. In addition to an eNB, a wireless access network node can alternatively refer to any of the following: a base station, a nodeB, a wireless local area network/metropolitan area network access point, radio network controller, or any other wireless access controller.

In the ensuing discussion, reference is made to more generic terms that are applicable for various different wireless access technologies, including "radio resource," "transmission opportunity," "orthogonal code" (or more simply "code"), and "random access resources." If applied to LTE, these terms can be mapped to corresponding LTE terms as follows:
  radio resource→resource block (RB);
  transmission opportunity→Physical Random Access Channel (PRACH) allocation;
  orthogonal code or code→PRACH preamble;
  random access resources→one or more preambles within a PRACH allocation.

In an LTE contention-based random access procedure, a UE randomly selects one of the multiple preambles to initiate an access. The selected preamble is transmitted in a PRACH resource. Upon detecting the preamble, the wireless access network node sends messaging to the UE, which continues further exchanges of messaging with the wireless access network node that ultimately can result in access being granted to the UE to perform data communications.

In accordance with some implementations, instead of using a random access resource to initiate a random access procedure in which a wireless access network node ultimately grants access of radio resources to the sensor device to communicate the sensor device's traffic data, the random access resources can themselves be used for carrying the traffic data of the sensor device. In alternative implementations, instead of using random access resources, other types of shared transmission resources can be used (discussed further below) for carrying traffic data of the sensor device.

FIG. 1 is a schematic diagram of an example arrangement that includes sensor devices 102 and UEs 104. The sensor devices 102 and UEs 104 are able to wirelessly communicate with a wireless access network 106, which includes wireless access network nodes 108 that support respective coverage areas.

The wireless access network nodes 108 are connected to core network node(s) 110, through which communications are performed with a data network 112 (e.g. Internet, local area network, etc.).

Figure 2B:
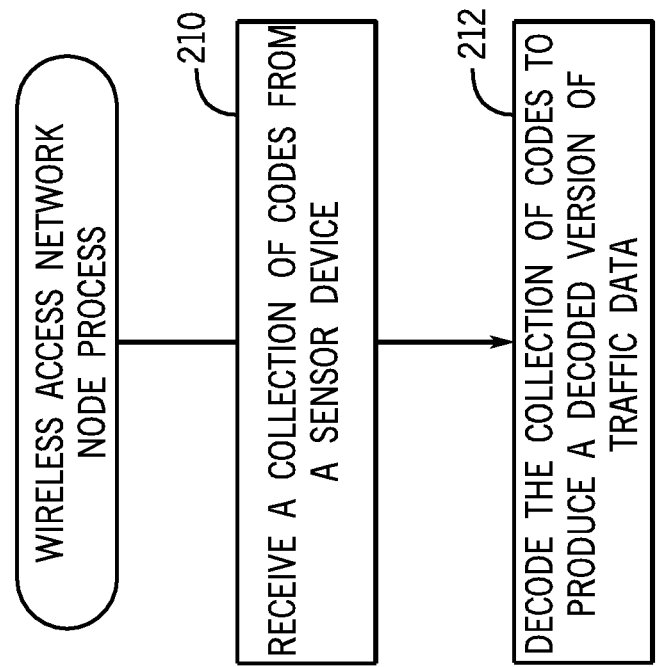
FIG. 2B is a flow diagram of a process of a wireless access network node, according to some implementations.
Figure 2A:
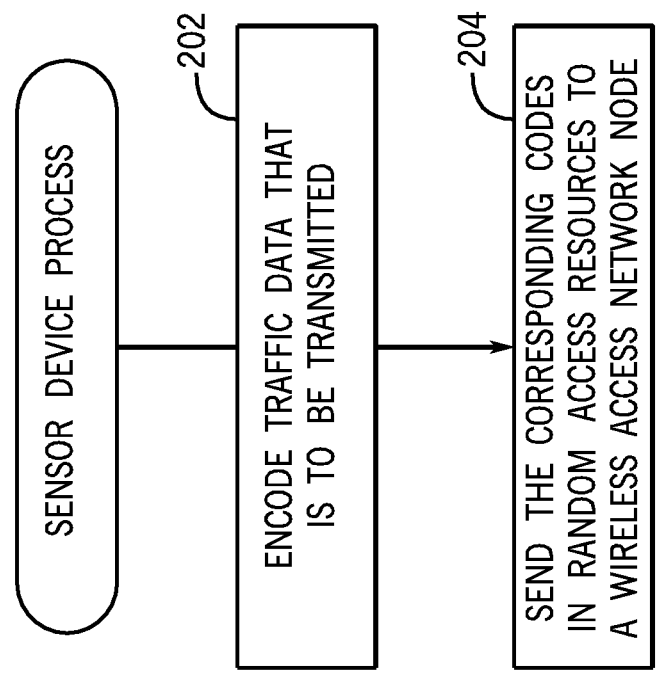
FIG. 2A is a flow diagram of a process of a server device, according to some implementations.

FIG. 2A is a flow diagram of a process of a sensor device 102, in accordance with some implementations. The sensor device 102 encodes (at 202) traffic data that is to be transmitted. The encoding can include dividing the traffic data into multiple chunks, and applying an encoding function to each of the chunks to produce a respective code. The sensor device 102 then wirelessly sends (at 204) the corresponding codes in respective random access resources, where the codes collectively provide an encoded representation of the traffic data. The codes are sent to a wireless access network node 108.

FIG. 2B is a flow diagram of a process of a wireless access network node 108 according to some implementations. The wireless access network node 108 wirelessly receives (at 210) in random access resources a collection of codes from a sensor device 102. The wireless access network node 108 then decodes (at 212) the collection of codes to produce a decoded version of the traffic data represented by the collection of codes. After decoding, the wireless access network node 108 can send the decoded traffic data to another node for forwarding the decoded traffic data to the targeted recipient of the traffic data. Alternatively, the wireless access network node 108 can use the decoded traffic data to perform an operation.

In accordance with further implementations, one or more of the following techniques can also be used for enhanced efficiency or flexibility in communicating traffic data from sensor devices to wireless access network nodes:

Configure multiple sensor devices (such as sensor devices within a given group) to map a particular traffic data value to the same sequence of codes so that the wireless access network node decodes and processes just one transmitted sequence of codes rather than multiple transmitted sequences of codes when the same traffic data value is being reported by the multiple sensor devices.

Configure different groups of sensor devices to use different mappings of data values to codes, which allows the wireless access network node to identify the group that a sensor device belongs to based on the codes received. For example, a first group of sensor devices is configured to use a first set of codes, a second group of sensor devices is configured to use a second set of codes, and so forth. Thus, if the wireless access network node receives a sequence of codes that is from the first set, then the wireless access network node can detect that the sensor device that sent the sequence belongs to the first group.

Assign transmission opportunities to different groups of sensor devices at different times to meet the reporting latency specifications associated with each group. For example, a first group of sensor devices may be assigned a lower latency specification (and thus should be given the ability to report traffic data with reduced latency) than a second group of sensor devices. As a result, transmission opportunities assigned to the first group of sensor devices can be such that a sensor device of the first group would have greater opportunity to send its traffic data as compared to a sensor device of the second group.

Assign subsequent transmission opportunities only to sequences of codes whose data values received thus far meet a specified criterion (or criteria). In other words, upon receiving a first code of a sequence from a sensor device in a first transmission opportunity, the wireless access network node assigns the next transmission opportunity to the sensor device for transmitting a second code of the sequence only if the first code meets a specified criterion (or criteria).

Assign subsequent transmission opportunities to different sequences of codes at different times to keep radio resources consumed by sensor traffic data within a specified bound. For example, if the wireless access network node detects that there is excessive sensor traffic data being sent by multiple sensor devices, the wireless access network node can spread apart the transmission opportunities for subsequence transmissions of codes of the sequences to ensure that at any given time, the amount of sensor traffic data does not exceed the specified bound.

Assign subsequent transmission opportunities to different sequences of codes at different times to allow communication of sensor traffic data values according to their specified importance. For example, the traffic data of a first sensor device may be considered to be more important that the traffic data of a second sensor device. As a result, the first sensor device would be given greater opportunity to transmit its traffic data than the second sensor device.

Identify a sequence number of the next code to be transmitted from sequences of codes when assigning a subsequent transmission opportunity to select the next traffic data field to be transmitted. This can allow the wireless access network node to specify that codes of a sequence be sent out-of-order.

Identify a sequence number of the next code to be transmitted from sequences of codes when assigning a subsequent transmission opportunity to request retransmission of corrupted information. For example, if a particular code in a sequence was not successfully received by a wireless access network node, then the wireless access network node can identify, to the sensor device, the sequence number of the code to re-transmit.

Traffic Data Encoding

Figure 3:
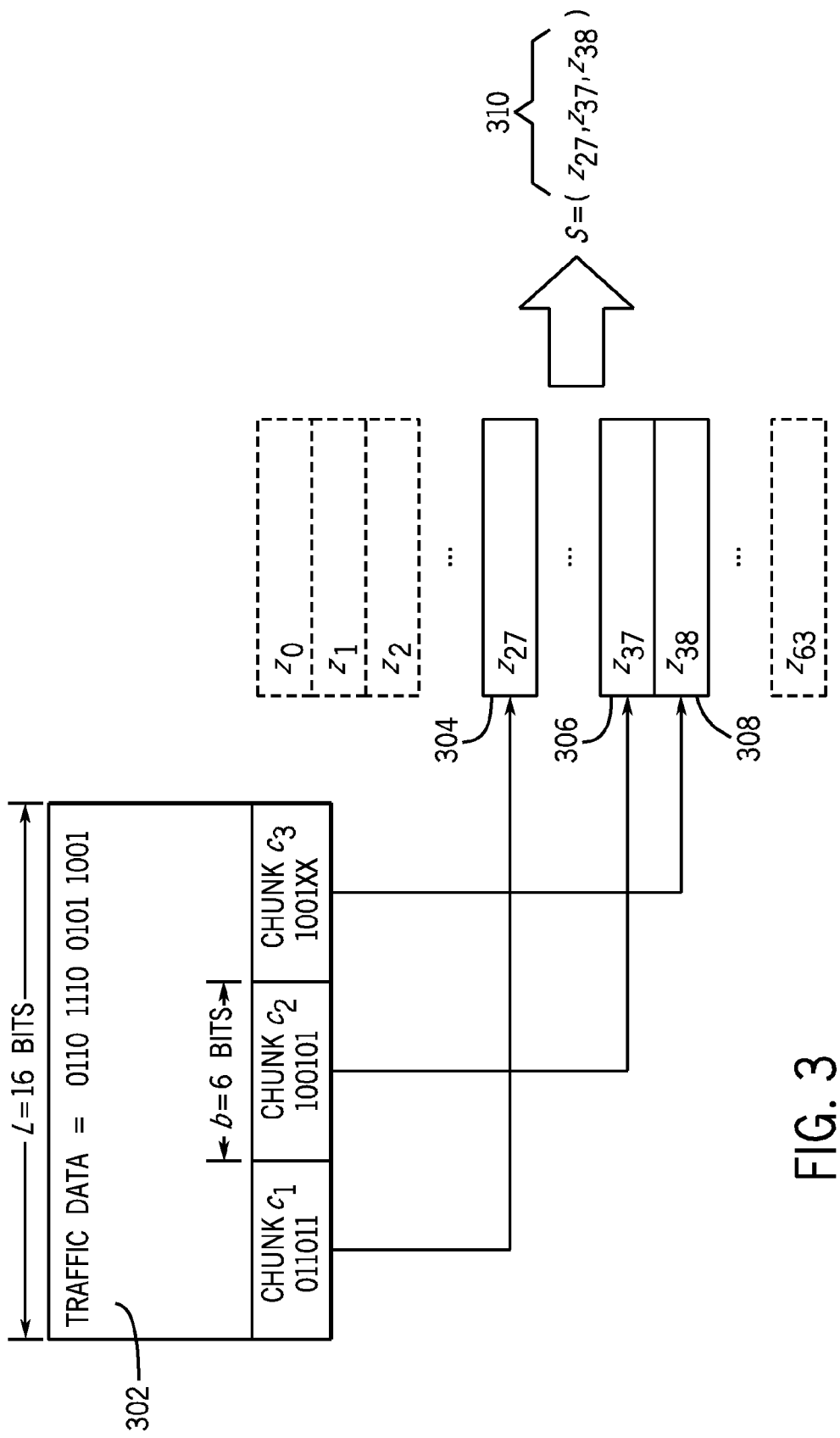
FIG. 3 schematically depicts encoding traffic data into a sequence of codes, in accordance with some implementations.

At a sensor device 102, the traffic data that is to be transmitted by the sensor device is encoded into a collection of codes (e.g. collection of LTE random access preambles). As shown in FIG. 3, traffic data 302 to be transmitted is divided into chunks, where each chunk is mapped to a respective code in the collection of codes. In the example of FIG. 3, the traffic data 302 is divided into three chunks $c_1$, $c_2$, $c_3$.

In the example of FIG. 3, the traffic data 302 is 16 bits long (has length L of 16 bits). Each of the three chunks $c_1$, $c_2$, $c_3$ is 6 bits long (each chunk has length b of 6 bits). Note that the third chunk ($c_3$) is padded with two extension bits at the end (represented as xx, where xx can be any specified value). The number (n) of chunks into which the traffic data 302 is divided is based on L and b—more specifically, n=[L/b] (the number of chunks is equal to the next larger integer of the value L/b).

Chunk $c_1$ is mapped to a first code 304 ($z_{27}$), chunk $c_2$ is mapped to a second code 306 ($z_{37}$), and chunk $c_3$ is mapped to code 308 ($z_{38}$). The three codes 304, 306, and 308 are selected from 64 total possible codes ($z_0$ to $z_{63}$), as shown in FIG. 3, based on the specific encoding that is performed on each chunk. More specifically, an encoding function can be applied to the content of each chunk, and this encoding function produces an output that corresponds to one of the 64 codes. The number of possible codes (K) to which a chunk can be mapped depends on the length of the corresponding chunk.

Although specific values are specified for L and b in the example of FIG. 3, it is noted that in other examples, traffic data can have other lengths and chunks can have other lengths. Moreover, different instances of traffic data can have different lengths, and chunks can have variable lengths.

As further depicted in FIG. 3, the codes 304, 306, and 308 are output in a sequence 310 of codes, $S=(z_{27}, z_{37}, z_{38})$. The codes of the sequence 310 are carried in respective random access resources to the wireless access network node 108 of FIG. 1.

Each code in the sequence is transmitted by the sensor device 102 in a random access resource within a transmission opportunity scheduled by the wireless access network node 108 that serves the sensor device.

In some implementations, the wireless access network node 108 can assign a first set of codes for use in signaling a random access attempt (as traditionally used by UEs 104), and a second, different set of codes for use in carrying traffic data from sensor devices 102. Thus, depending upon whether codes received by the wireless access network node 108 are part of the first set or second set, the wireless access network node 108 can determine whether the received codes are part of a contention-based random access procedure, or the received codes are used to convey traffic data. More specifically, if a sequence of codes received by the wireless access network node is from the first set of codes, then the wireless access network node detects the sequence as a random access attempt. On the other hand, if a sequence of codes received by the wireless access network node is from the second set, then the wireless access network node detects the second sequence as containing traffic data.

When codes are used to signal a random access attempt, the transmission of the same code by more than one UE in a given transmission opportunity is treated as a random access collision. In this scenario, a disambiguation procedure is performed to identify the UEs that were attempting to access the network. However, when codes are used to convey traffic data, the transmission of the same code by more than one sensor device in a given transmission opportunity is not treated as a collision; rather, it is treated as a condition in which multiple sensor devices are transmitting the same data portion.

Different sensor devices may send the same traffic data, or they may send different traffic data, or they may send traffic data that have a common portion and different portions. From the perspective of the wireless access network node, this is equivalent to different sensor devices sending the same sequence of codes, or sending completely different sequences of codes, or sending a sub-sequence of common codes followed by sub-sequences of different codes. The wireless access networks node can decode the received codes accordingly.

In the present discussion, reference is made to sending codes representing traffic data in random access resources in corresponding transmission opportunities. In other implementations, the codes representing traffic data can be sent in other types of shared transmission resources in corresponding time intervals. A shared transmission resource refers to a resource that can be used by multiple sensor devices to send code(s) representing respective portion(s) of traffic data to a wireless access network node. Within a given time interval, if at least two sensor devices are sending a common code (which corresponds to a common chunk to be sent by each of the at least two sensor devices), then the common code can be sent by the at least two sensor devices in the same shared transmission resource in the given time interval.

Note that the multiple sensor devices are to transmit their respective sequences of codes, where the sequences may share at least one common code if the respective traffic data to be transmitted by the multiple sensor devices share a common chunk. This common code sent in the same shared transmission resource in the same time interval is not treated as a collision by the wireless access network node, but rather is treated as a condition in which multiple sensor devices are transmitting the same data portion. After receiving codes in the shared transmission resources in a series of time intervals, the wireless access network node can decode the received codes to reproduce respective decoded versions of distinct traffic data transmitted by the multiple sensor devices. Note that if all of the sensor devices transmitted the same traffic data, then the wireless access network node would decode just one traffic data.

The techniques or mechanisms discussed herein relating to communicating codes of traffic data in random access resources can also be applied to communicating codes of traffic data in other types of shared transmission resources.

Further details of traffic data encoding are discussed below.

The traffic data to be sent by a sensor device D can be treated as an opaque bit string of length L. In some implementations, the length L is fixed and known to both a sensor device and the wireless access network node for a given group (or type) of sensor devices. In one variant, the traffic data sent by a sensor device D is always the same length and is equal to L. In another variant, the traffic data sent by a sensor device D may be of varying length, in which case L represents the fixed size of a container (e.g. packet data unit or PDU) for the traffic data and constrains the maximum length of the data bit string that is actually transmitted by the sensor device. In some examples, the actual length of the transmitted data is incorporated with the data bit string transmitted by a sensor device. In other implementations, the end of the data bit string is encoded into the data bit string transmitted by a sensor device.

The value of L may be determined in a number of different ways, some of which are dependent on the capabilities of the sensor device. For example, in some implementations, sensor devices may have relatively low processing power to reduce their cost. In these instances, the length L may be fixed for all sensor devices of a certain group; e.g. one type of sensor device may send 8 bits of data, while another type of sensor device may send 12 bits of data. The length L for a particular group of sensors is provisioned at the wireless access network node. In other implementations, sensor devices may be able to signal their capabilities (including the value of L) to the wireless access network node during an association or initialization phase that precedes communications of traffic data in random access resources.

Using any of various mechanisms, the value of L can be known a priori by both the wireless access network node and the sensor device.

As noted above, the data bit string of length L is partitioned into n chunks of equal length with b bits per chunk such that n=[L/b]—the last chunk of bits is extended or padded to ensure there are b bits in the last chunk. In some examples, the value of b (and, hence, of n) can be fixed and is known a priori to both the wireless access network node and the sensor device. This information may be explicitly configured by the wireless access network node through a broadcast or other signalling message, or the information may be preconfigured into the sensor devices. Note that the value of b is dependent on the number K of orthogonal codes made available by the wireless access network node in each transmission opportunity, $K=2^b$. In some implementations, the wireless access network node can send signalling to a sensor device to configure a number of available orthogonal codes to use for each transmission opportunity.

An encoding function E is applied to each chunk, $c_i$ ($1 \leq i \leq n$), to select one of the $K=2^b$ orthogonal codes from the set $Z=\{z_0, \ldots, z_{K-1}\}$, in other words, $E(c_i) \in Z$. The sequence of codes to be transmitted is $S=[k_1, \ldots, k_n]=[z_{E(c_1)}, \ldots, z_{E(c_n)}]$.

The foregoing describes implementations where the encoding of each chunk involves selecting an orthogonal code from a fixed number of possible orthogonal codes.

In alternative implementations, the wireless access network node may use various numbers of orthogonal codes for different chunks of traffic data. Such strategy can configure a reduced number of random access resources (reduced number of orthogonal codes) for the first transmission opportunity and to dynamically allocate a larger number of random access resources (larger number of orthogonal codes) for a subsequent transmission opportunity once the number of transmitted codes is known to the wireless access network node.

In such implementations, the traffic data to be sent by a sensor device D is treated as an opaque bit string of length L that is partitioned into m chunks of unequal length, with $b_i$ bits in chunk i (i=1 . . . m); the last chunk of bits can be extended or padded to ensure there are $b_m$ bits in the last chunk. For example, a data bit string of length L=16 may be partitioned into three chunks (m=3) with the length of the first chunk $b_1=4$, the length of the second chunk $b_2=8$, and the length of the third chunk $b_3=4$. Note that the value of $b_i$ is dependent on the number of orthogonal codes $K_i$ made available by the wireless access network node in transmission opportunity $t_i$, i.e. $K_i=2^{b_i}$.

In some examples, the number of chunks (m) is fixed and the length of each chunk ($b_i$) is known a priori to both the wireless access network node and the sensor devices for a given group (or type) of sensor devices. This information may be explicitly configured by the wireless access network node through a broadcast or other signalling message, or it may be preconfigured into the sensor devices.

In other examples, the number of chunks (m) may be variable, based on the number of orthogonal codes $K_i$ made available by the wireless access network node in each transmission opportunity $t_i$. The number of orthogonal codes $K_i$ (or, equivalently, the length of the chunk $b_i$) may be signalled to the sensor devices in the allocation of random access resources by the wireless access network node in each transmission opportunity. For example, with LTE, the Physical Downlink Control Channel (PDCCH) Downlink Control Information (DCI) may be extended to dynamically allocate random access resources to sensor devices. In some examples, an entire PRACH with 64 preambles may be dedicated to sensor device traffic data; in other examples, a number of preambles (≤64) may be allocated to sensor device traffic data within an existing PRACH allocation.

A function E is applied to each chunk, $c_i$ (1≤i≤m), to select one of the $K_i=2^{b_i}$ orthogonal codes from the set $Z_i=\{z_0, \ldots, z_{K_i-1}\}$, i.e. $E(c_i) \in Z_i$. The sequence of codes to be transmitted is therefore, $S=[k_1, \ldots, k_m]=[z_{E(c_1)}, \ldots, z_{E(c_m)}]$.

Simple Encoding Function

In some implementations, a simple encoding function E $(c_i) \rightarrow z_{v_i}$ can be applied, where the binary value $v_i$ of chunk $c_i$ selects orthogonal code $z_{v_i}$ to transmit in opportunity $t_i$ of the sequence. In other implementations, E may incorporate other parameters in addition to the binary value of $c_i$.

An example of the simple encoding function is illustrated in FIG. 3. The traffic data 302 to send is the data bit string {0110 1110 0101 1001}. Organizing the 16 bits of data into n=⌈16/6⌉=3 equal-length chunks results in:

$c_1$=011011,
$c_2$=100101,
$c_3$=1001xx.

In an example, the extension bits xx in the third chunk can be set to an alternating pattern of 1s and 0s, resulting in $c_3$=100110.

In the foregoing example, the binary values $v_1$, $v_2$, $v_3$ of the respective chunks $c_1$, $c_2$, $c_3$ are 27, 37, 38, respectively. Using function E $(c_i) \rightarrow z_{v_i}$ with the set of preambles $Z=\{z_0, \ldots, z_{63}\}$, the sequence of codes used to encode the traffic data 302 is $S=[k_1, k_2, k_3]=[z_{27}, z_{37}, z_{38}]$.

Grouping of Sensor Devices and Group Encoding Function

In alternative implementations, different encoding functions can be used for respective different groups of sensor devices.

In some examples, sensor devices can be organized into different groups. The sensor devices in a system may be organized into J (J≥1) groups such that all of the sensor devices in group $g_j$ (j∈J) can have, for example, one or more of the following in common:

are physically located within a particular geographical area;
 are owned by a particular entity;
 report the same type of information (e.g. temperature, hazardous gas levels, bridge girder strain);
 share some device characteristic (e.g. 8-bit traffic data versus 16-bit traffic data); or
 share a data encryption key.

In some implementations, an initial transmission opportunity $t_1^{g_j}$ may be assigned to the sensor devices of group $g_j$ so that a code received by the wireless access network node in $t_1^{g_j}$ can be associated with sensor group $g_j$.

In further implementations, an identifier for the sensor group $g_j$ associated with a sensor device may be included in the data bit string transmitted by that sensor device.

An encoding function E may be different for each sensor group $g_j$. For example, different groups may be assigned different sets of orthogonal codes such that, for group $g_j$, $Z^{g_j}=\{z_0^j, \ldots, z_{M-1}^j\}$. Therefore, when the wireless access network node receives a code $z_m^j$, the wireless access network node can determine that the information was transmitted by a sensor device within the sensor group $g_j$.

Figure 4:
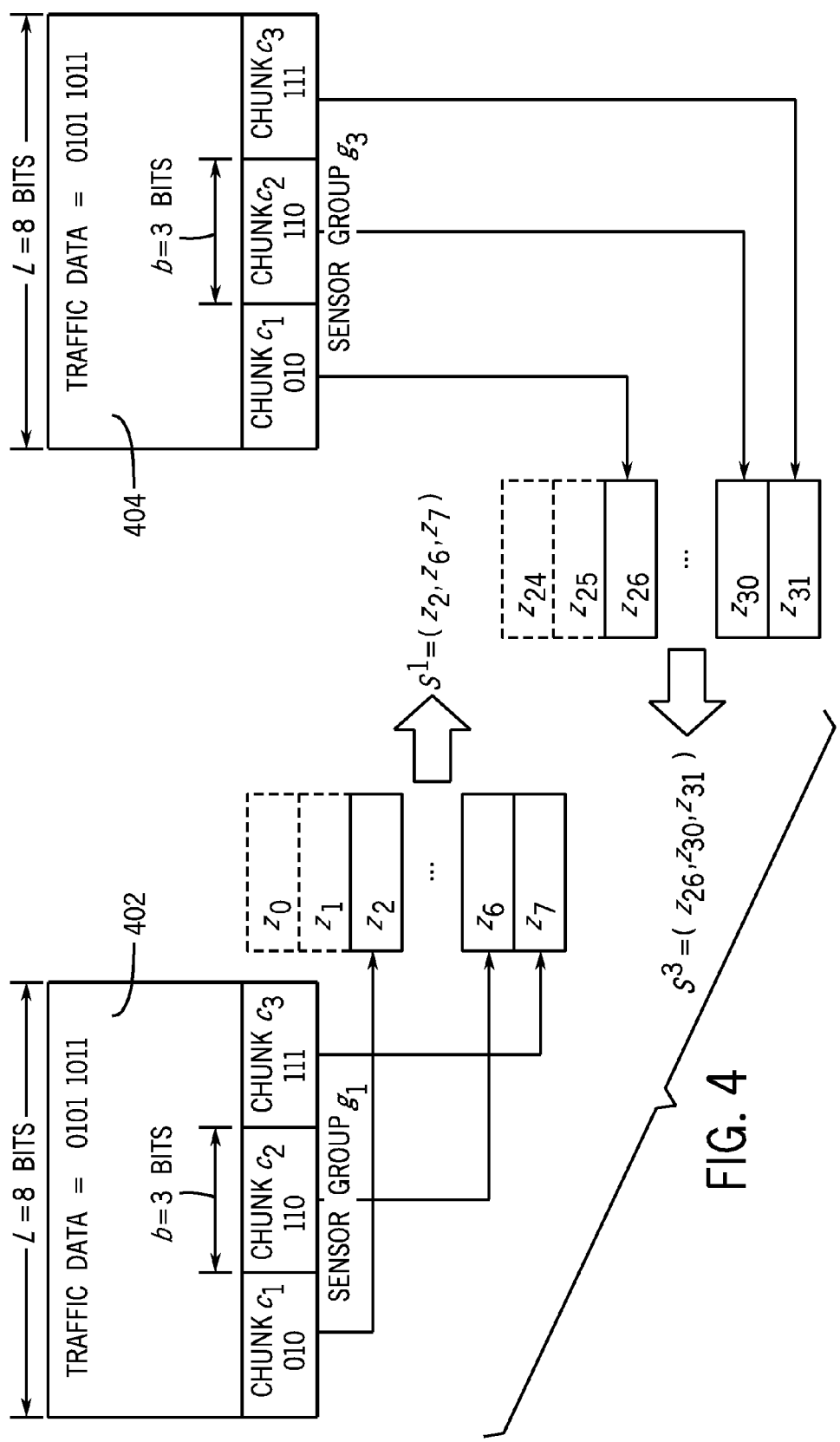
FIG. 4 schematically depicts encoding traffic data for sensor devices in different groups into respective different sequences of codes, in accordance with further implementations.

FIG. 4 shows an example of different encodings applied for sensor devices of two different groups $g_1$ and $g_3$. A sensor device in group $g_1$ is to send traffic data 402, and a sensor device in group $g_3$ is to send traffic data 404. Both traffic data 402 and 404 are the same 8-bit bit string {0101 1011}.

Sensor device $D_x^1$ is a member of device group $g_1$ while sensor device $D_y^3$ is a member of device group $g_3$. Each device group has been assigned 8 ($2^3$) orthogonal codes in each transmission opportunity such that the chunk length is b=3. The 8 orthogonal codes for each group may be selected from the 64 available orthogonal codes. In an example, device group $g_1$ has been assigned the set of orthogonal codes $Z^{g_1}=\{z_0, \ldots, z_7\}$, while device group $g_3$ has been assigned the set of orthogonal codes $Z^{g_3}=\{z_{24}, \ldots, z_{31}\}$.

Note that although this example shows the allocation of orthogonal codes in a contiguous block, other examples may allocate non-contiguous sets of codes and define an appropriate mapping function to select the orthogonal code corresponding to a given chunk of data. For example, $E(c_i) \rightarrow Z=\{z_1, z_7, z_{11}, z_{17}, z_{23}, z_{31}, z_{43}, z_{59}\}$.

Each traffic data 402 or 404 is divided into the following three chunks:

$c_1$=010,
$c_2$=110,
$c_3$=11x, where x is an extension bit to ensure that there are 3 bits in the final chunk.

In an example, the extension bit can be set to 1, resulting in $c_3$=111.

Using encoding function E $(c_i) \rightarrow z_{v_i}$ with the set of codes $Z^{g_1}=\{z_0, \ldots, z_7\}$, the sequence of codes used to encode the data from device $D_x^1$ is $S^1=[k_1^1, k_2^1, k_3^1]=[z_0, z_6, z_7]$.

Similarly, using the set of codes $Z^{g_3}=\{z_{24}, \ldots, z_{31}\}$, the sequence of codes used to encode the data from device $D_y^3$ is $S^3=[k_1^3, k_2^3, k_3^3]=[z_{26}, z_{30}, z_{31}]$.

As a result, the wireless access network node is able to determine that the same traffic data value has been reported by one or more sensor devices in each of two distinct sensor groups.

Traffic Data Transmission

As noted above, traffic data is sent from a sensor device D to a wireless access network node as a sequence $S_D$ of orthogonal codes $[k_1^D \ldots k_n^D]$. The sequence $S_D$ is sent iteratively with the sensor device transmitting code $k_i^D$ in a transmission opportunity $t_i$ designated by the wireless access network node. In each iteration i, the code $k_i^D$ in the sequence $S_D$ may also be transmitted by another sensor device in transmission opportunity $t_i$, in other words, for two transmitting sensor devices D1 and D2, it is possible that $k_i^{D1}=k_i^{D2}$.

For enhanced efficiency, the only random access resources initially allocated by the wireless access network node to sensor devices are the uplink resources for the first transmission opportunity $t_1$, allowing one or more sensor devices (with traffic data to report) to transmit the first code ($k_1$) in their respective sequence. The timing of this transmission opportunity is based on the latency specification associated with traffic data from the sensor devices allowed to transmit in that transmission opportunity.

Since data transmissions from sensor devices may be intermittent and may occur at unpredictable times, there is no guarantee that any sensor device will have data to transmit in that transmission opportunity. As a result, there may be some probability that the transmission opportunity may not be used by any sensor device and that the radio resources allocated for a given transmission opportunity $t_i$ may be wasted.

To reduce the number of potentially wasted radio resources, the wireless access network node dynamically allocates radio resources for each subsequent iteration $t_{i+1}$ only in response to the codes received in the previous iteration $t_i$. This allows the wireless access network node to allocate subsequent resources only in response to information actually transmitted by one or more sensor devices.

Figure 5:
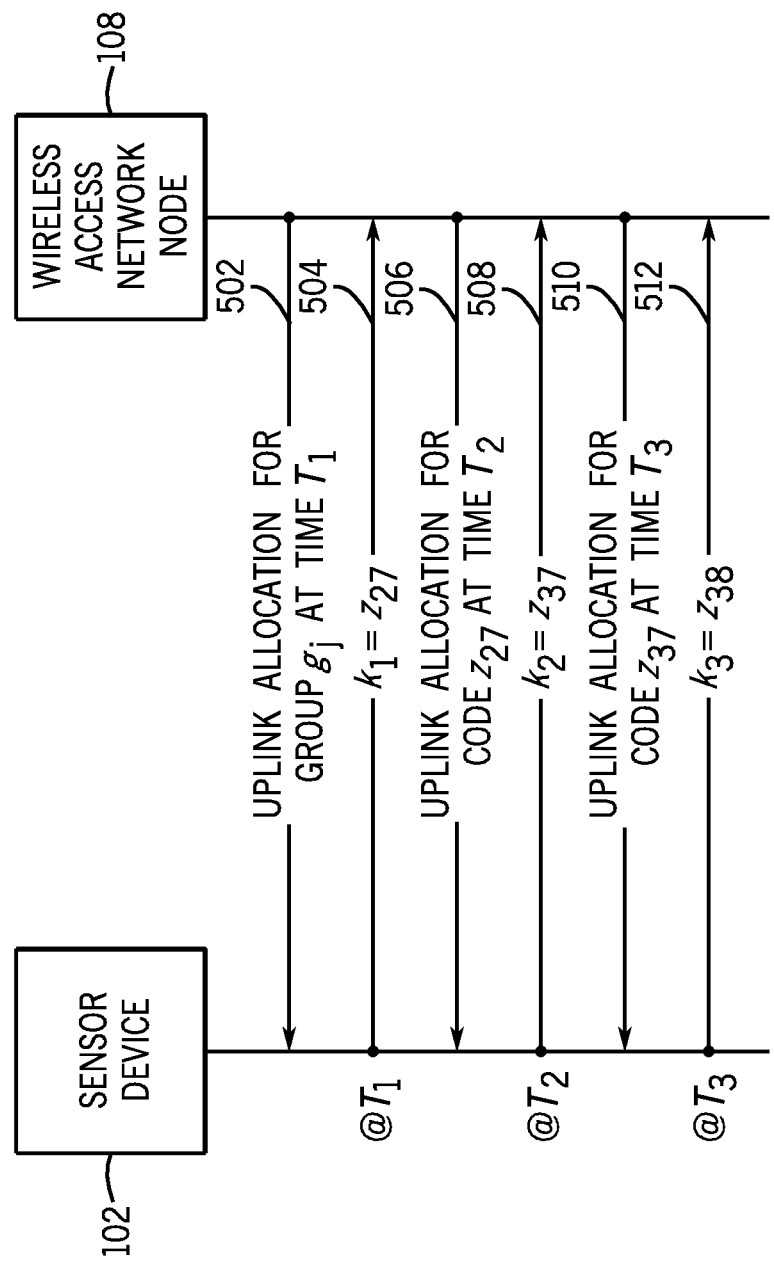
FIG. 5 is a message flow diagram of a process of communicating codes for traffic data in respective random access resources granted by a wireless access network node, in accordance with some implementations.

FIG. 5 is a message flow diagram of messaging exchanged between a sensor device 102 and a wireless access network node 108 for communicating sensor traffic data using codes in respective random access resources. It is assumed in the example of FIG. 5 that sensor devices are divided into multiple groups—in other examples, grouping is not performed.

The wireless access network node 108 sends (at 502) an uplink allocation (for assigning uplink resources) to the sensor device D (102) (and all of the other sensor devices in group $g_i$). The uplink grant provides a transmission opportunity at time $t_1^{gj} = T_1$.

At time $T_1$, the sensor device D uses the assigned uplink resources to transmit (at 504) the first code $k_1 = z_{27}$ (for example) in its sequence S. At least another sensor device in the group $g_i$ may also send its respective first code.

For each code $z_{r_1}$ detected by the wireless access network node 108 at time $T_1$, the wireless access network node 108 assigns uplink resources in a subsequent transmission opportunity $T_2$ for the transmission of the next code $k_2$ in the sensor devices' sequence, i.e. no uplink resources are assigned in $T_2$ for codes that are not detected at $T_1$. The wireless access network node 108 sends (at 506) another uplink allocation (for code $z_{27}$) to the sensor device D. The wireless access network node 108 also sends an uplink allocation for any other distinct code (received from another sensor device) detected by the wireless access network node 108.

The sensor device D detects the uplink allocation for $z_{27}$ and transmits (at 508) its second code $k_2 = z_{37}$ in the assigned resources at time $T_2$. Any other sensor device D would also send its respective second code using its respective uplink allocation at time $T_2$.

Again, for each code $z_{r_2}$ detected at time $T_2$, the wireless access network node 108 assigns uplink resources in a subsequent transmission opportunity $T_3$ for the transmission of the next code $k_3$ in the sensor devices' sequences, i.e. no uplink resources are assigned in $T_3$ for codes that are not detected at time $T_2$. The wireless access network node 108 sends (at 510) another uplink allocation (for code $z_{37}$) to the sensor device D. The wireless access network node 108 also sends an uplink allocation for any other distinct code (received from another sensor device) detected by the wireless access network node 108.

The sensor device D detects the uplink allocation for $z_{37}$ and transmits (at 512) its third and final code $k_3 = z_{38}$ in the assigned resources at time $T_3$. Any other sensor device D would also send its respective second code using its respective uplink allocation at time $T_3$.

Note that the number of uplink resources assigned at a given time $T_{i+1}$ is not based on the number of sensor devices that transmitted at time $T_i$; rather, the number of uplink resources assigned at time $T_{i+1}$ is based on the number of unique codes received by the wireless access network node 108 at time $T_i$ in respective random access resources.

To reduce the number of uplink resources used to convey traffic data from a population of sensor devices, data to be transmitted from the sensor devices should be organized to enhance the probability that multiple sensor devices will send the same data chunk value (by use of the same code) in an allocated uplink resource. For example, when data is sent with the most significant bit first, the sensor devices can be configured to send the common codes corresponding to the most significant bits in the same random access resources, followed by the sending of distinct codes corresponding to the different least significant bits.

Figure 6:
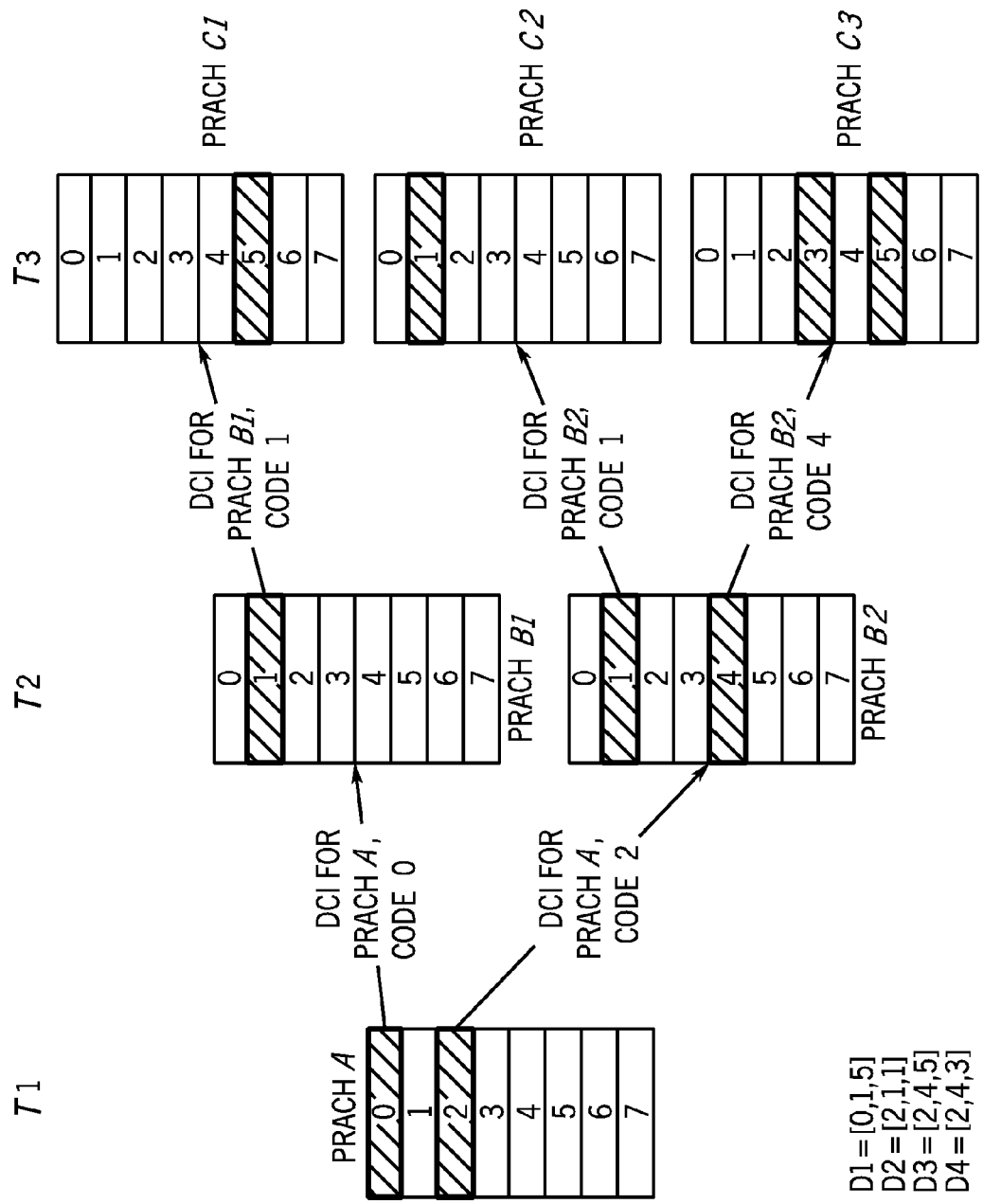
FIG. 6 schematically depicts encoding traffic data of multiple sensor devices, in accordance with some implementations.

FIG. 6 depicts a specific example in which there are four sensor devices D1, D2, D3, and D4 that are to transmit respective traffic data using codes in respective random access resources. FIG. 6 assumes an LTE implementation in which the random access resources are PRACH resources.

In the FIG. 6 example, it is assumed that the wireless access network node 108 has configured the system such that eight orthogonal codes (preambles) {0, 1, . . . , 71} are available in each PRACH, and that the traffic data in each sensor device has been divided into three chunks (n=3). The four sensor devices have the following sequences of codes to transmit:

D1=[0,1,5],
D2=[2,1,1],
D3=[2,4,5],
D4=[2,4,3].

An initial PRACH resource, PRACH A, has also been semi-statically allocated by the wireless access network node 108, and the configuration of PRACH A has been communicated to all sensor devices D1-D4 (at 502 in FIG. 5, for example) using a System Information Block (SIB) or Radio Resource Control (RRC) signalling.

At time T1, the four sensor devices each transmit the first code in their sequence using the resources of PRACH A, i.e. sensor device D1 transmits code 0, while sensor devices D2, D3, and D4 all transmit code 2. The hashed blocks in PRACH A indicate which of the codes in {0, 1, . . . , 7} were transmitted in PRACH A by the four sensor devices.

The wireless access network node 108 detects the two distinct transmitted codes 0 and 2 and dynamically allocates an additional PRACH resource for each detected distinct code. Physical Downlink Control Channel (PDCCH) Downlink Control Information (DCI) can be used to signal the allocation of PRACH B1 for sensor device(s) (i.e. D1) that transmitted code 0, and the allocation of PRACH B2 for all sensor devices (i.e. D2, D3, and D4) that transmitted code 2. There is one PDDCH DCI per allocated PRACH resource. PDDCH DCIs are examples of uplink allocations transmitted by the wireless access node 108 at 506 in FIG. 5.

Each of the sensor devices decodes the DCI corresponding to its first transmitted code. At time 72, the four sensor devices then transmit the second code in their sequence using the respective assigned PRACH, i.e. the sensor device D1 transmits code 1 in PRACH B1, the sensor device D2 transmits code 1 in PRACH B2, and the sensor devices D3 and D4 both transmit code 4 in PRACH B2.

The wireless access network node 108 detects the one transmitted code 1 in PRACH B1 and the two transmitted codes 1 and 4 in PRACH B2, and dynamically allocates an additional PRACH resource for each detected code. PDCCH DCIs (sent at 510 in FIG. 5, for example) are used to signal the allocation of PRACH C1 for all sensor devices (i.e. D1) that transmitted code 1 in PRACH B1, the allocation of PRACH C2 for all sensor devices (i.e. D2) that transmitted code 1 in PRACH B2, and the allocation of PRACH C3 for all sensor devices (i.e. D3 and D4) that transmitted code 4 in PRACH B2.

Each of the sensor devices decodes the DCI corresponding to its second transmitted code and then, at time T3, the four sensor devices transmit the third code in their sequence using the assigned PRACH resources, i.e. the sensor device D1 transmits code 5 in PRACH C1, the sensor device D2 transmits code 1 in PRACH C2, the sensor device D3 transmits code 5 in PRACH C3, and the sensor device D4 transmits code 3 in PRACH C3.

The wireless access network node 108 detects the four distinct codes transmitted in the third iteration thus detects the conclusion of the transmissions of respective traffic data by the four sensor devices.

Duplicate Traffic Data Filtering

Various management tasks can be performed by a wireless access network node 108 to improve efficiency in transmissions of traffic data by sensor devices. In some implementations, a wireless access network node 108 may configure all sensor devices in a group to use the same mapping function E(c). As noted above, since the data value reported by a sensor device may not be unique, multiple sensor devices in a group may, at any given time, report the same chunk value and, in doing so, will transmit the same code. This provides an inherent and effective traffic data filter so that a wireless access network node only has to handle unique chunk values transmitted by the sensor group.

Such traffic data filtering can reduce resource usage. Since uplink resources are assigned based on the codes $Z_{r_i}$ received in iteration i, fewer distinct codes result in assignment of fewer uplink resources to sensor devices. Since resource assignments are based on the number of received codes and not on the number of sensor devices, this also reduces the number of downlink control channel resources for transmitting uplink grants from the wireless access network node 108 to the sensor devices.

Traffic data filtering can also mitigate effects of reporting storms. If a single event results in the near-simultaneous transmission of the same information from numerous sensor devices, the number of distinct reports is significantly reduced thereby such that scheduling overhead and access link congestion can be reduced.

Traffic data filtering also reduces backend processing load. With a reduction in the number of distinct reports by sensor devices, the amount of information processing performed by backend servers (including the wireless access network nodes 108) is also reduced.

Truncating Data Values

In some implementations, the first bit of a data bit string corresponding to traffic data can represent the most significant bit of the traffic data so that the most significant bits of the data are transmitted first. In some implementations, a wireless access network node 108 can control the precision of the data values being reported by prematurely terminating the sequence of transmission opportunities (before the entirety of the traffic data is sent). This has the effect of truncating the traffic data.

For example, a sensor device may be equipped to provide very accurate measurements that are represented in a data bit string of length L and reported in n chunks of b bits per chunk, where b<<L. In some instances, a wireless access network node 108 may wish to receive all L bits (n chunks) of the traffic data, but in other instances the wireless access network node 108 may decide to stop receiving the least significant bits of information after receiving only m (m<n) chunks (i.e. m*b bits). The wireless access network node 108 can perform the truncation by deciding to not send any further grants of uplink resources to a sensor device for further chunk(s) of the traffic data, even though not all chunk(s) of the traffic data has or have been sent by the sensor device.

Truncating reported traffic data may be performed to (1) dynamically control the precision of reported traffic data values; (2) reduce radio resource usage when reported traffic data values differ in only the l (l=L−(m*b)) least significant bits; (3) reduce radio resource usage by ignoring data values that fall outside a range that is of interest; or (4) reduce system load during reporting storms.

Sampling Traffic Data Values

In some implementations, a wireless access network node 108 may selectively sample the traffic data transmitted by a group of sensor devices to reduce the volume of sensor traffic data or to discard traffic data values that are not of interest. For example, after decoding the codes $k_{i-1}$ received in the transmission opportunity at $t_{i-1}$, the wireless access network node 108 may only allocate subsequent transmission opportunities to those codes $k_i$ corresponding to:

the j largest $k_{i-1}$ values (j≥1);

the i smallest $k_{i-1}$ values (i≥1);

$k_{i-1}$ values within the range $V_{LOWER}$ and $V_{UPPER}$;

$k_{i-1}$ values outside a standard deviation of the previously reported code values;

$k_{i-1}$ values outside the normal reporting range of a sensor device or group of sensor devices; or a specific subset of reporting sensor devices.

The foregoing are examples of criteria used by the wireless access network node 108 to determine whether or not a transmission opportunity (and the respective uplink resources) are to be assigned in response to a received code from a sensor device. The wireless access network node 108 can use any one or some combination of the foregoing criteria.

Figure 7:
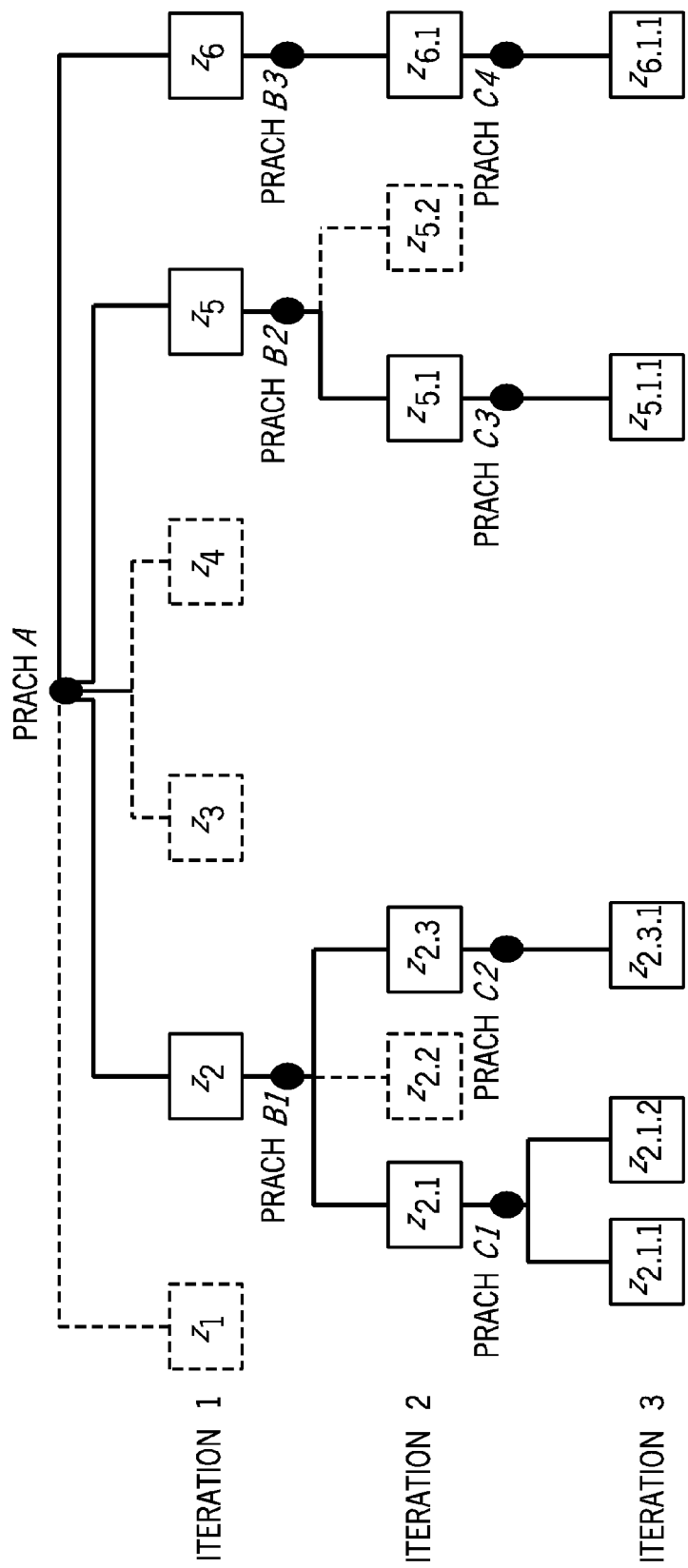
FIGS. 7 and 8 schematically depict the selection of subsets of sequences for transmission from sensor devices to a wireless access network node, in accordance with some implementations.

An example of sampling traffic data values is illustrated in FIG. 7, in which the thicker lines show the sampled sequence paths (i.e. paths corresponding to sequences from sensor devices that are selected for transmission by the wireless access network node 108). In this example, transmission of the data bit string of length L from the sensor devices is performed in three iterations (n=3).

In iteration 1 (the first transmission opportunity), the wireless access network node 108 detects six codes, $z_1$, $z_2$, $z_3$, $z_4$, $z_5$ and $z_6$, in PRACH A, where the six codes represent the initial codes in the sequences to be transmitted by six or more sensor devices.

Based on the corresponding values of the received codes in iteration 1, the wireless access network node 108 chooses to assign subsequent transmission resources (PRACH B1, PRACH B2, PRACH B3) to three of the sequences, i.e. those associated with codes $z_2$, $z_5$ and $z_6$. No transmission resources are assigned to the other three sequences, i.e. associated with codes $z_1$, $z_3$, and $z_4$ (represented by dashed boxes) in iteration 1.

In iteration 2, the wireless access network node 108 receives codes $z_{2.1}$, $z_{2.2}$ and $z_{2.3}$ in PRACH B1, codes $z_{5.1}$ and $z_{5.2}$ in PRACH B2, and code $z_{6.1}$ in PRACH B3. Based on the corresponding values of the received codes, the wireless access network node 108 chooses to assign subsequent transmission resources (PRACH C1, PRACH C2, PRACH C3, PRACH C4) to four of the sequences, i.e. those associated with codes $z_{2.1}$, $z_{2.3}$, $z_{5.1}$ and $z_{6.1}$. However, no transmission resources are assigned to the other two sequences, i.e. those associated with codes $z_{2.2}$ and $z_{5.2}$ (represented by dashed boxes in iteration 2).

In iteration 3, the wireless access network node 108 receives codes representing the final values for the selected sequences in their assigned transmission opportunities, including codes $z_{2.1.1}$ and $z_{2.1.2}$ in PRACH C1, code $z_{2.3.1}$ in PRACH C2, code $z_{5.1.1}$ in PRACH C3 and code $z_{6.1.1}$ in PRACH C4.

In some examples, the sequence paths of FIG. 7 not selected by the wireless access network node 108 for transmission may represent sensor traffic data values that are not of interest to the wireless access network node 108. For example, such sensor traffic data values may have been discarded by the wireless access network node 108 even if received. Alternatively, the unselected transmission paths may correspond to truncated portions of sensor traffic data values. In other examples, the wireless access network node 108 may revisit the sequence paths that were not selected in the first set of iterations and retrieve those previously unselected traffic data portions in a subsequent set of iterations (such as when load balancing is performed, as discussed below).

Load Balancing

In some implementations, a wireless access network node 108 may be configured with an upper bound on the number of radio resources per transmission opportunity that may be allocated to sensor traffic data. By selectively scheduling transmission opportunities for subsequent iterations based on received code sequences (discussed above), the wireless access network node 108 can constrain traffic to a subset of the received code sequences to meet a target amount of sensor traffic data to be transmitted at any given time.

For example, in an LTE system, a wireless access network node 108 may be configured to limit the number of radio resources (e.g. resource blocks) available for sensor traffic data to x % (x≥0) of the available channel bandwidth in a given frame. If the number of unique codes $k_i$ received in a PRACH resource at transmission opportunity $t_i$ would involve allocation of subsequent PRACH resources that would exceed this x % constraint, the wireless access network node 108 may allocate PRACH resources for a first subset of codes in one frame and for a second subset of codes in a subsequent frame, and so on, until all of the sensor devices of interest have had an opportunity to report their data.

For example, after retrieving the sensor data values associated with the first three sequences corresponding to the initial codes $z_2$, $z_5$ and $z_6$ (as shown in FIG. 7), the wireless access network node 108 may schedule transmission opportunities for further iterations to obtain the remaining codes for the other three sequences corresponding to the initial codes $z_1$, $z_3$, and $z_4$, to retrieve the remaining sensor traffic data values.

Figure 8:
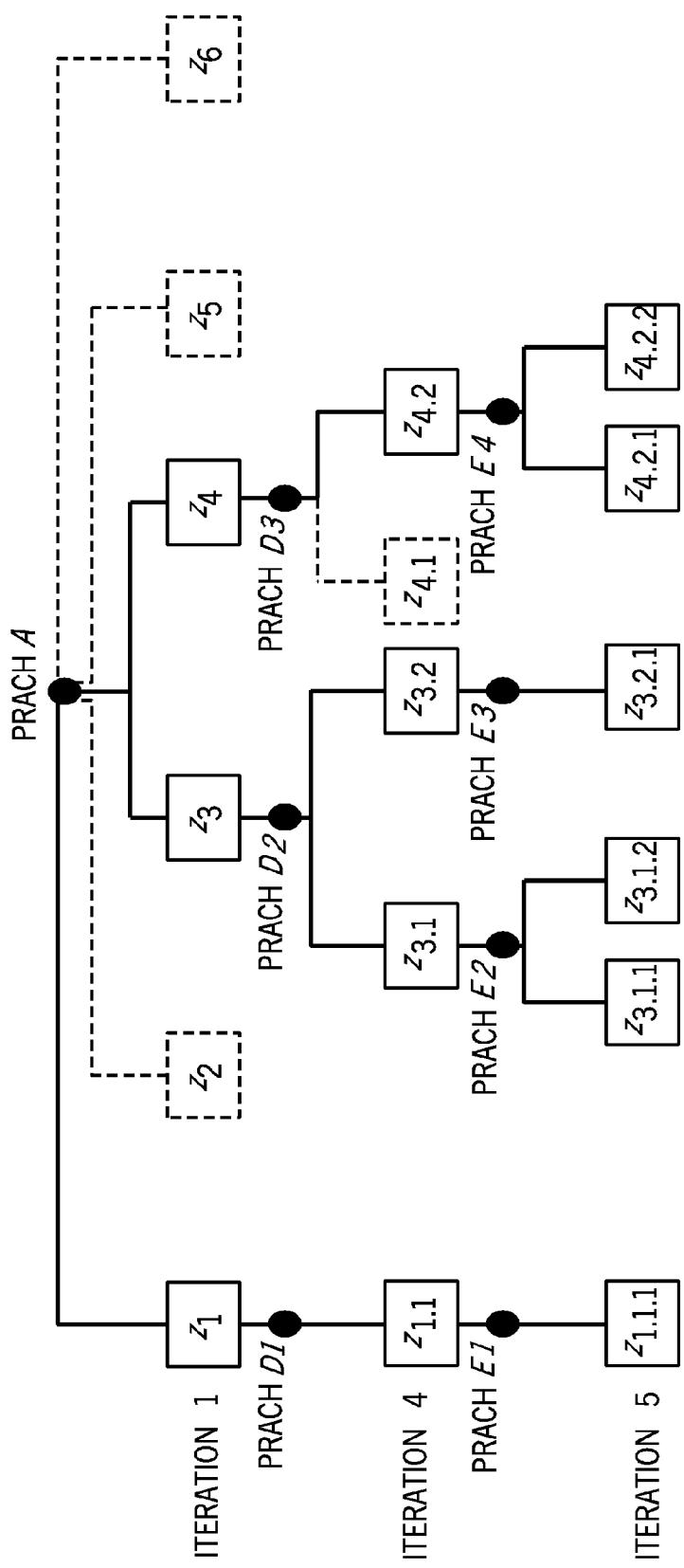

FIG. 8 shows iteration 1 (of FIG. 7), in addition to iterations 4 and 5 (which occur after iteration 3 of FIG. 7). Following completion of iteration 3 (in FIG. 7) and reception of the sequences corresponding to the initial codes $z_2$, $z_5$ and $z_6$ (depicted in FIG. 7), the wireless access network node 108 next assigns transmission resources (PRACH D1, PRACH D2, PRACH D3) to the three remaining sequences, i.e. those associated with codes $z_1$, $z_3$, and $z_4$ in iteration 1.

In iteration 4, the wireless access network node 108 receives code $z_{1.1}$ in PRACH D1, codes $z_{3.1}$ and $z_{3.2}$ in PRACH D2, and codes $z_{4.1}$ and $z_{4.2}$ in PRACH D3. Based on the corresponding values of the received codes, the wireless access network node 108 chooses to assign subsequent transmission resources (PRACH E1, PRACH E2, PRACH E3, PRACH E4) to four of the sequences, i.e. those associated with codes $z_{1.1}$, $z_{3.1}$, $z_{3.2}$ and $z_{4.2}$. However, the wireless access network node 108 does not assign further transmission resources to the sequence associated with code $z_{4.1}$ (represented by a dashed box).

In iteration 5, the wireless access network node 108 receives codes representing the final values for the second set of sequences in their assigned transmission opportunities: code $z_{1.1.1}$ in PRACH E1, codes $z_{3.1.1}$ and $z_{3.1.2}$ in PRACH E2, code $z_{3.2.1}$ in PRACH E3 and codes $z_{4.2.1}$ and $z_{4.2.2}$ in PRACH E4.

In further implementations, in addition to load balancing as discussed above, the scheduling of transmission opportunities may be prioritized to ensure that the sampled sensor traffic data values are received according to their specified importance. The wireless access network node 108 may, for example, allocate transmission opportunities according to one or more of the following criteria:

the j largest $k_{i-1}$ values in transmission opportunity $t_{i-1}$;
the i smallest $k_{i-1}$ values;
$k_{i-1}$ values within the range $v_{LOWER}$ and $v_{UPPER}$;
$k_{i-1}$ values outside a standard deviation of previously reported code values;
$k_{i-1}$ values outside the normal reporting range of a sensor device or group of sensor devices; or
a specified subset of reporting sensor devices.

In this way, the wireless access network node 108 can trade off the number of radio resources allocated to sensor traffic data in any given frame against the increased latency associated with spreading sensor traffic data over an extended period of time.

Reporting Structured Data

In some implementations, the information reported by a sensor device is structured so that a data bit string of length L is made up of f (f≥1) fields of respective lengths $[L_1, \ldots, L_f]$ such that $L=L_1+L_2+ \ldots L_f$. In some cases, the fields $[F_1, \ldots, F_f]$ can be reported in sequence (in other words, according to the sequence of chunks that make up the data bit string). In other cases, the wireless access network node 108 may skip some fields by controlling which chunk is to be transmitted by a sensor device in the next transmission opportunity. For example, with LTE, the Physical Downlink Control Channel (PDCCH) Downlink Control Information (DCI) may be extended to identify the sequence number (i) of a sequence to be reported in the allocated uplink resources; this will indicate to the sensor device which chunk ($c_i$) and corresponding code ($k_i$) in the sequence the sensor device should report. A sequence is made up of codes indexed by respective sequence numbers. In another example, the DCI may be extended to identify the bit q, within the L bits of the data bit string (i.e. q selected from the range 1 to L), that will be the first bit of the next chunk transmitted by the sensor device.

Figure 9:
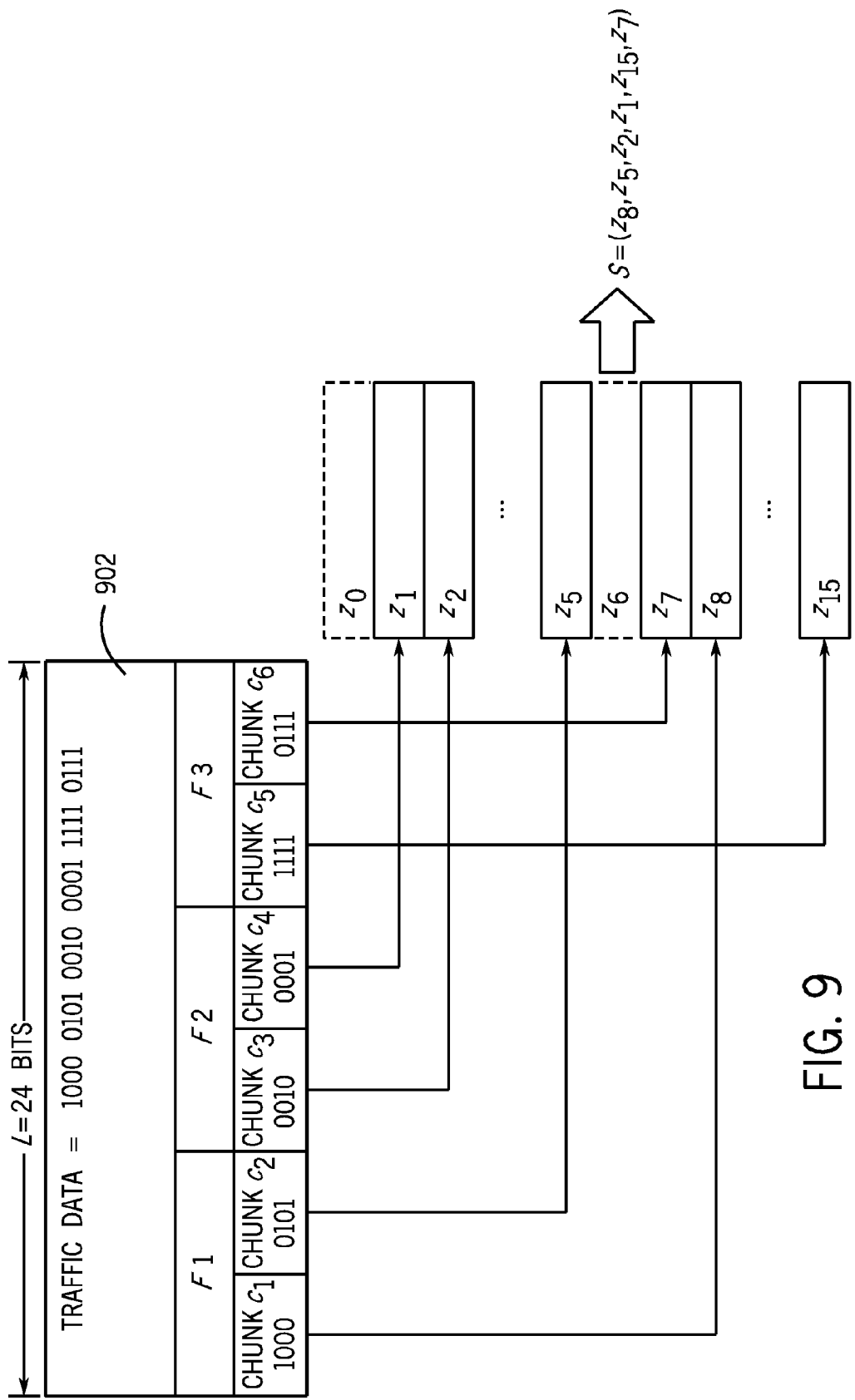
FIG. 9 schematically depicts encoding data fields of traffic data to transmit to a wireless access network node, in accordance with further implementations.

For example, as shown in FIG. 9, a sensor device D has 24 bits (L=24) of traffic data 902 to transmit, where the traffic data 902 includes a data bit string {1000 0101 0010 0001 1111 0111}.

A set of codes are used that includes 16 ($2^4$) codes in each transmission opportunity, which means that the chunk length is 4 (b=4).

Organizing the 24 bits of the data bit string into n=[24/4]=6 equal-length chunks results in:
$c_1$=1000,
$c_2$=0101,
$c_3$=0010,
$c_4$=0001,
$c_5$=1111,
$c_6$=0111.

As a result, the values of the six chunks are as follows:

$$[v_1, v_2, v_3, v_4, v_5, v_6] = [8, 5, 2, 1, 15, 7].$$

Using function $E(c_i) \rightarrow z_{v_i}$ with the set of codes $Z = \{z_0, \ldots, z_{15}\}$, the resulting sequence of codes used to encode the data is:

$$S = [k_1, k_2, k_3, k_4, k_5, k_6] = [z_8, z_5, z_2, z_1, z_{15}, z_7].$$

In this example, each group of 8 bits can be treated as a structured data field, $F_d$ (d selected from the range 1 to f), so that the data bit string is defined as data fields $[F_1, F_2, F_3] \rightarrow [(c_1, c_2), (c_3, c_4), (c_5, c_6)]$. As shown in FIG. 9, a sensor device sends the first field $F_1$ in two iterations (at times $T_1$ and $T_2$, respectively) corresponding to $(c_1, c_2) \rightarrow (k_1, k_2) \rightarrow (z_8, z_5)$.

The wireless access network node 108 then responds with an allocation for the fifth code in the sequence ($k_5$) at time $T_3$, skipping the third and fourth codes in the sequence ($k_3$ and $k_4$), which effectively skips data field $F_2$.

The sensor device then sends the data field $F_3$ in two iterations (at times $T_3$ and $T_4$, respectively) corresponding to $(c_5, c_6) \rightarrow (k_5, k_6) \rightarrow (z_{15}, z_7)$.

The wireless access network node 108 can later send an allocation for one of the third and fourth codes, which corresponds to the field $F_2$, to cause the sensor device to send the data field $F_2$ in two iterations (at times $T_5$ and $T_6$).

Using the foregoing techniques, the wireless access network node 108 can cause the sensor device to send codes out-of-sequence, rather than in-sequence.

Identifying Sensor Devices

As noted above, in some implementations, a recipient of traffic data from a sensor device does not care about the specific identity of the sensor device. In other implementations, identifiers of sensor devices can be provided.

For example, a sensor device identifier may be appended to the sensor traffic data to form a data bit string to be transmitted. Conceptually, the added bits can be considered a part of the data that is sought by the wireless access network node 108 and may be similarly requested in a sequential manner. This allows the wireless access network node 108 to either receive both the data and the identifier or, by truncating the data bit string, to receive only (the most significant bits of) the data or, by selectively skipping portions of the data (such as depicted in connection with FIG. 9), to receive the identifier and only the most significant bits of the sensor traffic data.

The sensor device identifier may, for example, include one or more of:
- a unique device identifier;
- a manufacturer's product identifier;
- a hardware (version) identifier; or
- a software (version) identifier.

System Architecture

Figure 10:
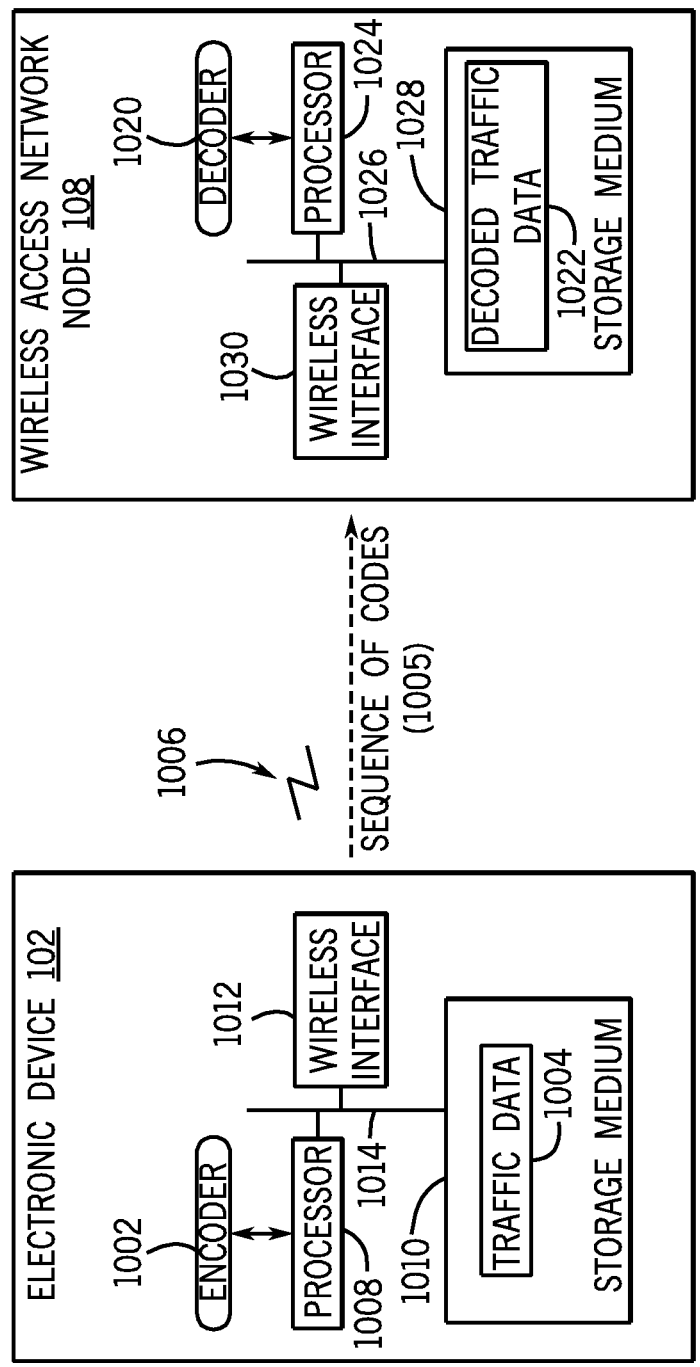
FIG. 10 is a block diagram of an arrangement that includes an electronic device and a wireless access network node, in accordance with some implementations.

FIG. 10 is a block diagram of an example arrangement that includes an electronic device (e.g. sensor device 102) and a wireless access network node 108 according to some implementations.

The electronic device 102 includes an encoder 1002 that encodes traffic data 1004 of the electronic device 102 according to some implementations. The encoded traffic data includes a sequence of codes 1005 that are transmitted in respective random access resources over a wireless link 1006 to the wireless access network node 108. The encoder 1002 is executable on one or multiple processors 1008, which is connected over a bus 1014 to a storage medium 1010 (that stores the traffic data 1004) and a wireless interface 1012 to perform wireless communications with the wireless access network node 108. A processor can include a microprocessor, microcontroller, processor module or subsystem, programmable integrated circuit, programmable gate array, or another control or computing device.

The wireless access network node 108 receives the sequence of codes 1005. The wireless access network node 108 includes a decoder 1020 to decode the sequence of codes 1005, which produces decoded traffic data 1022 (which is a copy of the traffic data 1004 in the electronic device 102).

The decoder 1020 is executable on one or multiple processors 1024, which can be connected over a bus 1026 to a storage medium 1028 (which can store the decoded traffic data 1022) and a wireless interface 1030 to perform wireless communications with the electronic device 102.

The wireless access network node 108 can send the decoded traffic data 1022 to another node for communication to an intended recipient of the decoded traffic data 1022, which can be a device coupled to the data network 112 of FIG. 1, for example.

The storage media 1010 and 1028 can include a random access memory (RAM) (e.g. dynamic RAM or static RAM), read-only memory (ROM) (e.g. erasable and programmable read-only memory (EPROM), electrically erasable and programmable read-only memory (EEPROM), or flash memory), and/or secondary storage (e.g. magnetic or optical disk-based storage), and so forth.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   encoding, by an electronic device, traffic data as a collection of codes;
   sending, by the electronic device over a wireless link to a wireless access network node, the codes in random access resources, the codes providing an encoded representation of the traffic data; and
   dividing the traffic data into plural chunks,
   wherein the encoding comprises applying at least one encoding function to the plural chunks to produce the corresponding codes, wherein a size of at least one of the chunks corresponds to a number of codes available for encoding the respective chunk.

2. The method of claim 1, wherein sending the codes in the random access resources comprises sending the codes in physical random access channel (PRACH) resources.

3. The method of claim 1, wherein sending the codes comprises sending physical random access channel (PRACH) preambles.

4. The method of claim 1, wherein the electronic device is a sensor device, and wherein encoding the traffic data comprises encoding measurement data collected by the sensor device.

5. The method of claim 1, wherein the number of codes available is configured by signaling from the wireless access network node.

6. The method of claim 1, further comprising:
   receiving, by the electronic device, a first uplink grant that specifies a first random access resource in a first transmission opportunity, wherein a first of the codes is sent in the first random access resource;
   receiving, by the electronic device, a second uplink grant that specifies a second random access resource in a second transmission opportunity, wherein the second uplink grant is responsive to the first code; and sending, by the electronic device to the wireless access network node, a second of the codes in the second random access resource.

7. The method of claim 1, wherein sending the codes comprises sending the codes in-sequence or out-of-sequence.

8. The method of claim 1, wherein encoding the traffic data comprises encoding the traffic data along with an identifier of the electronic device, wherein the encoded representation represents the traffic data and the identifier of the electronic device.

9. The method of claim 1, wherein the traffic data is different from data communicated by the electronic device to obtain access of wireless resources of the wireless access network node.

10. A method comprising:
encoding, by an electronic device, traffic data as a collection of codes;
sending, by the electronic device over a wireless link to a wireless access network node, the codes in random access resources, the codes providing an encoded representation of the traffic data; and
dividing the traffic data into plural chunks,
wherein the encoding comprises applying at least one encoding function to the plural chunks to produce the corresponding codes, and wherein:
a number of codes available for encoding is the same for each chunk of the plural chunks, or
a number of codes available for encoding a first of the plural chunks is different from a number of codes available for encoding a second of the plural chunks.

11. A wireless access network node comprising:
a wireless interface configured to receive, from an electronic device, a collection of codes in random access resources from an electronic device, the collection of codes being a representation of traffic data from the electronic device; and
at least one processor configured to:
produce the traffic data from the collection of codes, wherein the codes in the collection are from a first set of codes assigned for conveying traffic data;
receive a further code;
determine whether the further code is part of the first set of codes or a second set of codes assigned for contention-based random access; and
in response to determining that the further code is part of the second set of codes, initiate a random access procedure.

12. The wireless access network node of claim 11, wherein the at least one processor is configured to decode each of the codes of the collection to produce a respective chunk, wherein the chunks produced from the codes of the collection form the traffic data.

13. The wireless access network node of claim 11, wherein the at least one processor is configured to define plural groups of electronic devices, and wherein the plural groups of electronic devices are assigned respective different sets of codes to use for encoding respective traffic data.

14. The wireless access network node of claim 11, wherein the at least one processor is configured to identify distinct codes sent by plural electronic devices, and to assign further random access resources in response to the identified distinct codes.

15. The wireless access network node of claim 14, wherein the further random access resources are assigned based on a number of the distinct codes sent by the plural electronic devices.

16. The wireless access network node of claim 11, wherein the at least one processor is configured to cause truncation of original data to be transmitted by the electronic device, wherein the traffic data represented by the collection of codes is a truncated version of the original data to be transmitted by the electronic device.

17. The wireless access network node of claim 11, wherein the at least one processor is configured to constrain use of random access resources for carrying traffic data from electronic devices, as part of a load balancing procedure.

18. The wireless access network node of claim 11, wherein the at least one processor is configured to assign different transmission opportunities to different sensor devices.

19. The wireless access network node of claim 11, wherein the traffic data is different from data communicated by the electronic device to obtain access of wireless resources of the wireless access network node.

20. A wireless access network node comprising:
a wireless interface configured to receive, from an electronic device, a collection of codes in random access resources from an electronic device, the collection of codes being a representation of traffic data from the electronic device; and
at least one processor configured to produce the traffic data from the collection of codes, wherein the at least one processor is configured to selectively allocate further random access resources to a subset of electronic devices that are sending traffic data, wherein the selective allocation is based on a determination of whether codes received from the electronic devices meet one or more specified criteria.

21. An electronic device comprising:
a wireless interface to communicate wirelessly with a wireless access network node; and
at least one processor to:
encode traffic data as a collection of codes, wherein the traffic data is different from data communicated by the electronic device to obtain access of wireless resources of the wireless access network node;
send, over a wireless link to the wireless access network node, the codes in random access resources, the codes providing an encoded representation of the traffic data, wherein the codes in the collection are from a first set of codes assigned for conveying traffic data; and
send a further code from a second set of codes to use for performing a contention-based random access procedure to obtain wireless resources of the wireless access network node.

* * * * *